May 19, 1936.    C. L. HALL    2,041,335
FASTENER SECURED INSTALLATION AND FASTENER MEMBER THEREFOR
Filed Jan. 12, 1933
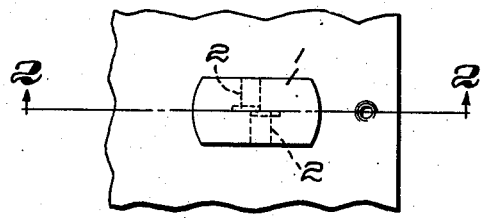
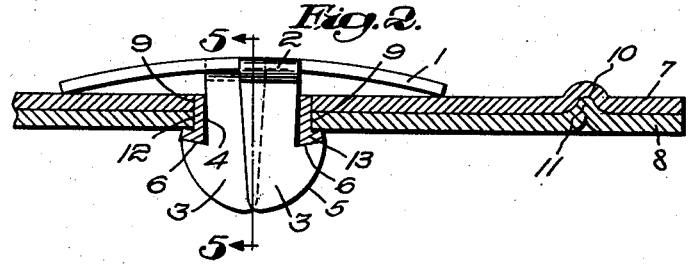
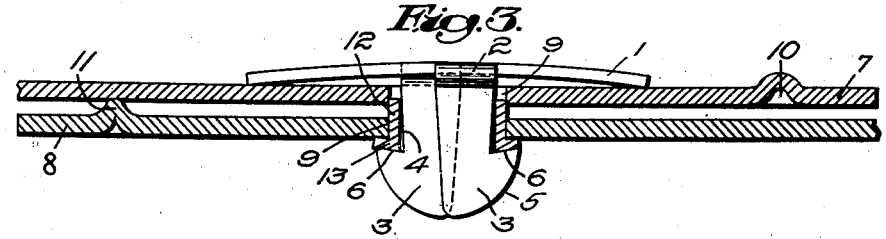
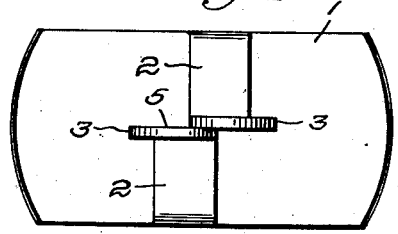 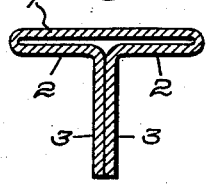
Inventor:
Charles L. Hall,
by Emery, Booth, Varney & Townsend
Attys Patented May 19, 1936

2,041,335

UNITED STATES PATENT OFFICE 2,041,335

FASTENER SECURED INSTALLATION AND FASTENER MEMBER THEREFOR

Charles L. Hall, Detroit, Mich., assignor to United-Carr Fastener Corporation, Cambridge, Mass., a corporation of Massachusetts Application January 12, 1933, Serial No. 651,314

4 Claims. (Cl. 287—101)

My invention aims to provide improvements in fastener secured installations and fastener members therefor.

In the drawing which illustrates a preferred embodiment of my invention:—

Figure 1 is a plan view of a portion of an installation embodying my invention;

Fig. 2 is an enlarged section taken on the line 2—2 of Figure 1, the hinge pin fastener member being shown in elevation;

Fig. 3 is a section similar to that shown in Fig. 2 but showing the juxtaposed apertured members rotated and moved slightly away from each other;

Fig. 4 is a under side plan of the hinge pin member per se; and

Fig. 5 is a section of the fastener member taken on the line 5—5 of Fig. 2.

My invention is particularly useful as an installation wherein it is desirable to secure together two members which are adapted to be rotated relative to each other and/or which are adapted to be moved away from and toward each other either when the parts are rotated or when no rotation is desired. Such members may be exemplified by relatively rotatable perforated plates, such as are commonly applied to control air passage as at a blower inlet or a ventilation opening, by relatively movable blades, as those of a rule or variable carpenter's square, and the like.

The fastener member which secures the parts together is in the nature of a yieldable hinge pin constructed along the lines of a snapped fastener so that it may be snapped into position.

In the particular embodiment of my invention selected for illustration by the drawing, the hinge pin snap fastener is formed from a single piece of sheet metal and has a base 1 substantially longer in one direction than in the transverse direction (Figs. 1 and 2) and preferably dished so as to be generally concavo-convex in shape lengthwise of the base, as best illustrated in Fig. 2. The exact shape and formation of the base is not important so long as it may yield to a substantial extent. The hinge pin fastener illustrated also has a pair of projections formed by inwardly bent portions 2—2 extending from opposite edges of the base 1 toward the center and outwardly extending portions 3—3. The portions 2—2 are preferably spaced from the base portion 1 so that they may have a twisting or torsional action when the portions 3—3 are moved relative to each other in a scissors-like action.

The portions 3—3 are arranged in overlapping relation for a scissors-like action and the outer edges are so shaped as to provide a neck 4 of substantial length, a head 5 having converging surfaces and sharp shoulders 6—6 for locking the fastener in position.

In the particular installation selected for illustration of my invention I have provided two relatively thin sheet metal parts 7 and 8 (Figs. 1 and 3) each of which is provided with an aperture 9—9 in alignment with each other. The plate-like members 7 and 8 are adapted to be rotated relative to each other and are provided with interlocking detent members to prevent accidental rotation. The member 7 is provided with a recess 10 and is adapted to receive the boss 11 formed in the member 8. The detent members 10 and 11 are shown in cooperative engagement in Fig. 2 so that the members 7 and 8 may be held against rotation and in contacting engagement. In Fig. 3 the members 7 and 8 are illustrated as having been rotated 180 degrees and the members 7 and 8 have been moved axially away from each other to permit the boss member 11 to ride out of the depression 10. The installation also preferably includes a bushing having a hollow shank portion 12 of substantially the same length as the combined thicknesses of the members 7 and 8 and extending into the apertures 9—9. The bushing is also provided with a flange 13 resting against the outer face of the plate-like member 8 (Figs. 2 and 3) to prevent the bushing from passing entirely through the plates 7 and 8 and also to receive and cooperate with the shoulders 6—6 of the shank of the fastener member, as will be further hereinafter described.

The parts of the installation may be easily and quickly assembled by placing the plate-like members 7 and 8 together with the detent means 10 and 11 in cooperative engagement, as best illustrated in Fig. 2.

Thereafter the bushing is placed with the shank 12 in the apertures 9—9 and the head 5 of the hinge pin fastener is pressed through the shank 12 of the bushing from outside of the plate-like member 7. As the head 5 contracts to pass through the shank 12 of the bushing the projecting portions 2—2 move relative to each other like the arms of a scissors due to torsion set up in the inwardly extending portions substantially parallel with the yieldable base 1. After the head has passed through the bushing it expands again to its normal position and the abrupt shoulders 6—6 engage with the flange 13 of the bushing and the base 1 yieldingly engages the outer face of the plate-like member 7, as best illustrated in Fig. 2. Since there is considerable spring to the base 1 of the hinge pin fastener member the thickness of the members 7 and 8 may vary to some extent so that a given fastener may be used with the plate members of various thicknesses. The cooperation of the abrupt shoulders 6—6 and the yieldable base 1 holds the plate members 7 and 8 together and normally presses one toward the other so that when the detent means is engaged, as illustrated in Fig. 2, the members 7 and 8 are held against relative rotation and the parts of the installation are prevented from rattling. When it is desirable to rotate the parts 7 and 8 one may be moved relative to the other by application of sufficient force to cause the boss member 11 of the detent means to ride out of the recess 10 and around the inner surface of the member 7. During this operation the plate members 7 and 8 must move away from each other and therefore to facilitate such movement the base 1 of the fastener yields, as illustrated in Fig. 3. The plate members rotate about the shank 12 of the bushing as a hub and move relative to the bushing so that the bushing preferably remains stationary relative to the fastening member. Therefore, since the bushing is interposed between the fastening member and the plate 8, the shoulders 6—6 cannot interfere with rotation of the plate 8, nor can they scratch or mar the face of the plate 8 adjacent to its aperture 9. While my fastener, in its preferred embodiments, is sufficiently secure in its operation to be used in effecting permanent assemblies of parts such as those hereinbefore mentioned, it is susceptible of ready removal from such parts when such removal is desired, by pressing the shank members 3 together either directly or by applying torsion to the arms 2 by suitable means; and in this connection pressure on the yieldable base to relieve the force of engagement of the hook members 6 with the part contacted thereby, will facilitate moving of the arms 3 to collapse the head 5 to enable removal thereof through the aperture.

While I have illustrated and described a preferred embodiment of my invention, I do not wish to be limited thereby, because the scope of my invention is best defined by the following claims.

I claim:

1. A fastener secured installation comprising, in combination, a pair of juxtaposed apertured members having the apertures in alignment, a bushing having a flange bearing against one member and a tubular shank extending into the apertures, a snap fastener member having a yieldable shank extending through the apertures of both members, a yieldable base on one end of said shank contacting with one of said members at points remote from where the shank joins the base, and a shouldered head on the other end of said shank engaging said bushing and holding the said members together at the other member, said yieldable base permitting relative movement of said apertured members toward and away from each other, and said bushing permitting relative rotary movement of one of the apertured members relative to the snap fastener member.

2. A fastener secured installation comprising, in combination, a pair of juxtaposed apertured members constructed and arranged for movement away from each other and having apertures in alignment, a bushing having a flange bearing against the outer face of one of said members and having a tubular shank extending into at least one of the apertures, a one-piece snap fastener member having a yieldable base concavo-convex in cross-section and bearing against the outer face of the member opposite to the one against which the flange of the bushing engages to permit movement of one member away from the other and a shank comprising a pair of movable projections extending from said yieldable base through the shank of the bushing and having shoulders adjacent to the outer edges engaging the flange of the bushing thereby to permit relative rotation of the juxtaposed apertured members without relative rotation of the shank of the fastener member relative to the bushing.

3. A hinge pin fastener installation comprising, in combination, a pair of rotatable members having aligned apertures, a bushing having a flange bearing against the outer face of one of said rotatable members and having a tubular shank extending into at least one of the apertures in said rotatable members, a hinge pin fastener having a dished yieldable base bearing against the outer face of the member opposite to the one against which the flange of the bushing engages, a shank comprising a pair of movable projections extending from opposite sides of said base through the bushing and each of said movable projections having a relatively abrupt shoulder engaging over the flange of the bushing to cooperate with the base of the fastener thereby to lock the parts of the installation together while permitting movement of the rotatable members axially relative to the fastener because of the resiliency of the base and also permitting rotation of the rotatable members without interference from the abrupt shoulders on the shank of the fastener member.

4. A one-piece fastener member of the class described having a base elongated in one direction and curved in cross-section in the same direction to permit yielding thereof, a shank comprising a pair of movable socket-engaging portions extending toward each other from the opposed longest side edges of and beneath the base in substantially parallel spaced relation to the base to provide torsionally yieldable portions at the crest of the curve of the base so as to be free from interference from and with the base and then extending away from said base, in a scissors-like relation and the opposite edges of said socket-engaging portions being shaped to make snap fastening engagement with a cooperating member.

CHARLES L. HALL.